United States Patent
Chakraborty

(10) Patent No.: US 9,499,402 B2
(45) Date of Patent: Nov. 22, 2016

(54) METHOD FOR PREPARING A SUPPORTED RUTHENIUM CATALYST

(75) Inventor: Debasish Chakraborty, Copenhagen (DK)

(73) Assignee: Elbit Systems Land and C4I Ltd., Netanya (IL)

( * ) Notice: Subject to any disclaimer, the term of this patent is extended or adjusted under 35 U.S.C. 154(b) by 269 days.

(21) Appl. No.: 14/118,301

(22) PCT Filed: May 15, 2012

(86) PCT No.: PCT/EP2012/002089
§ 371 (c)(1),
(2), (4) Date: Jul. 3, 2014

(87) PCT Pub. No.: WO2012/156080
PCT Pub. Date: Nov. 22, 2012

(65) Prior Publication Data
US 2014/0322622 A1    Oct. 30, 2014

Related U.S. Application Data

(60) Provisional application No. 61/487,927, filed on May 19, 2011.

(30) Foreign Application Priority Data

May 19, 2011    (EP) .................................... 11004160

(51) Int. Cl.
*C01B 3/08* (2006.01)
*H01M 8/06* (2016.01)
(Continued)

(52) U.S. Cl.
CPC .................. *C01B 3/08* (2013.01); *B01J 21/04* (2013.01); *B01J 23/46* (2013.01); *B01J 23/462* (2013.01);
(Continued)

(58) Field of Classification Search
CPC .............................. H01M 8/0606; C01B 3/08
See application file for complete search history.

(56) References Cited

U.S. PATENT DOCUMENTS

2010/0317901 A1* 12/2010 Chaudhari ............ B01J 29/166
568/861

FOREIGN PATENT DOCUMENTS

KR    1020040054815    6/2004

OTHER PUBLICATIONS

Zawadzki et al., "Synthesis and Structure Characterization of Ru Nanoparticles Stabilized by PVP or gamma A-1203", Materials Research Bulletin, Elsevier, Kidlington, GB, vol. 13, No. 11, Nov. 3, 2008, pp. 3111-3121.

*Primary Examiner* — Stewart Fraser
(74) *Attorney, Agent, or Firm* — Pearl Cohen Zedek Latzer Baratz LLP

(57) ABSTRACT

In a method of preparing a ruthenium-containing catalyst on a non-conductive metal oxide support comprises dissolving one or more ruthenium precursor compounds in an liquid organic polyol, combining the thus obtained solution with (a) nano-powder(s) of one or more metal oxides in a ratio of moles metal oxide(s) to moles ruthenium atoms in the one or more ruthenium precursor compounds of about 0:1 to about 6:1, the metal oxide nano-powder(s) having a surface area of from about 5 to about 300 $m^2/g$ and a point of zero charge (PZC) of pH 5.5 or higher, agitating the thus obtained mixture, adding pre-shaped alumina support pellets to the agitated mixture, which is than heated at a temperature of about 50° C. to the boiling point of the organic polyol, until the reaction is finished, cooling the mixture and combining it with an aqueous solution of $NaNO_3$ and/or $KNO_3$, agitating the resultant mixture, separating the solvent and the solids, and drying the thus obtained solid pellets of alumina, or alumina and the metal oxide(s) of the nano-powder(s) coated with ruthenium and an additional amount Na and/or K ions. Also disclosed is the supported ruthenium-containing catalyst obtainable by the method and the use thereof in decomposing ammonia into nitrogen and oxygen.

16 Claims, 2 Drawing Sheets

(51) Int. Cl.
*B01J 21/04* (2006.01)
*B01J 23/46* (2006.01)
*B01J 23/58* (2006.01)
*B01J 23/63* (2006.01)
*B01J 23/644* (2006.01)
*B01J 35/00* (2006.01)
*B01J 35/10* (2006.01)
*B01J 37/02* (2006.01)
*B01J 37/08* (2006.01)
*C01B 3/04* (2006.01)

(52) U.S. Cl.
CPC ............... *B01J 23/58* (2013.01); *B01J 23/63* (2013.01); *B01J 23/644* (2013.01); *B01J 23/6447* (2013.01); *B01J 35/00* (2013.01); *B01J 35/002* (2013.01); *B01J 35/0013* (2013.01); *B01J 35/10* (2013.01); *B01J 35/1009* (2013.01); *B01J 35/1014* (2013.01); *B01J 35/1019* (2013.01); *B01J 35/1038* (2013.01); *B01J 35/1042* (2013.01); *B01J 37/02* (2013.01); *B01J 37/0203* (2013.01); *B01J 37/0211* (2013.01); *B01J 37/0221* (2013.01); *B01J 37/08* (2013.01); *C01B 3/047* (2013.01); *H01M 8/0606* (2013.01); *Y02E 60/324* (2013.01); *Y02E 60/364* (2013.01); *Y02E 60/50* (2013.01)

METHOD FOR PREPARING A SUPPORTED RUTHENIUM CATALYST

RELATED APPLICATIONS

This application is a national stage application, filed under 35 U.S.C. §371, of PCT Application No. PCT/EP2012/002089, filed May 15, 2012, which claims benefit to U.S. Provisional Application No. 61/487,927, filed May 19, 2011 and European Patent Application No. 11 004 160.5 filed on May 19, 2011, the contents of each of which are hereby incorporated by reference in their entirety.

FIELD OF THE INVENTION

The present invention relates to a method of preparing a supported ruthenium-containing catalyst, to the catalysts obtainable thereby and to the use of the catalyst in decomposing ammonia into nitrogen and hydrogen.

BACKGROUND OF THE INVENTION

Ruthenium-containing catalysts for decomposing ammonia into nitrogen and hydrogen which may for example be used in low-temperature fuel cells have conventionally been prepared according to the method described in U.S. Pat. No. 5,055,282, herein incorporated in its entirety by reference, namely by introducing granules of $Al_2O_3$ into an aqueous solution of $RuCl_3$ and an alkali or alkaline earth nitrate, calcining the solid product and reducing the ruthenium in a stream of hydrogen for three hours at 400° C.

Accordingly, the alumina granules are first impregnated with $RuCl_3$, and then the ruthenium ions on the impregnated granules are reduced.

According to the cited patent the ammonia conversion is quantitative already at 500° C.

This preparation method of a $Al_2O_3$-supported Ru catalyst for decomposing ammonia is energy and time consuming, since hydrogen has to be streamed over the $RuCl_3/Al_2O_3$ for 3 hours at 400° C.

Furthermore, catalysts prepared according to that method have a drawback: Chloride ions can be captured in pores of the alumina granules, which deteriorates the catalyst performance during use at the high temperatures required for cracking ammonia.

At that temperatures there is also a propensity of the ruthenium/alkali or alkaline earth metal clusters on the alumina to aggregate during prolonged use at high temperatures.

SUMMARY OF THE INVENTION

In a first aspect, the invention relates to a method of preparing a ruthenium-containing catalyst on a non-conductive metal oxide support, which method comprises dissolving one or more ruthenium precursor compounds in an liquid organic polyol, combining the thus obtained solution with (a) nano-powder(s) of one or more metal oxides in a ratio of moles metal oxide(s) to moles ruthenium atoms in the one or more ruthenium precursor compounds of about 0:1 to about 6:1, the metal oxide nano-powder(s) having a surface area of from about 5 to about 300 $m^2/g$ and a point of zero charge (PZC) of pH 5.5 or higher, agitating the thus obtained mixture, adding pre-shaped alumina support pellets to the agitated mixture, which is than heated at a temperature of about 50° C. to the boiling point of the organic polyol, until the reaction is finished, cooling the mixture and combining it with an aqueous solution of $NaNO_3$ and/or $KNO_3$, agitating the resultant mixture, separating the solvent and the solids, and drying the thus obtained solid pellets of alumina or alumina and the metal oxide(s) of the nano-powder coated with ruthenium and an additional amount Na and/or K ions.

In a second aspect, the invention relates to a supported ruthenium-containing catalyst, obtainable according to the method of the invention.

In a third aspect, the invention relates to the use of the supported ruthenium-containing catalyst in a method for decomposing $NH_3$ into $N_2$ and $H_2$.

DETAILED DESCRIPTION

Figure 1:
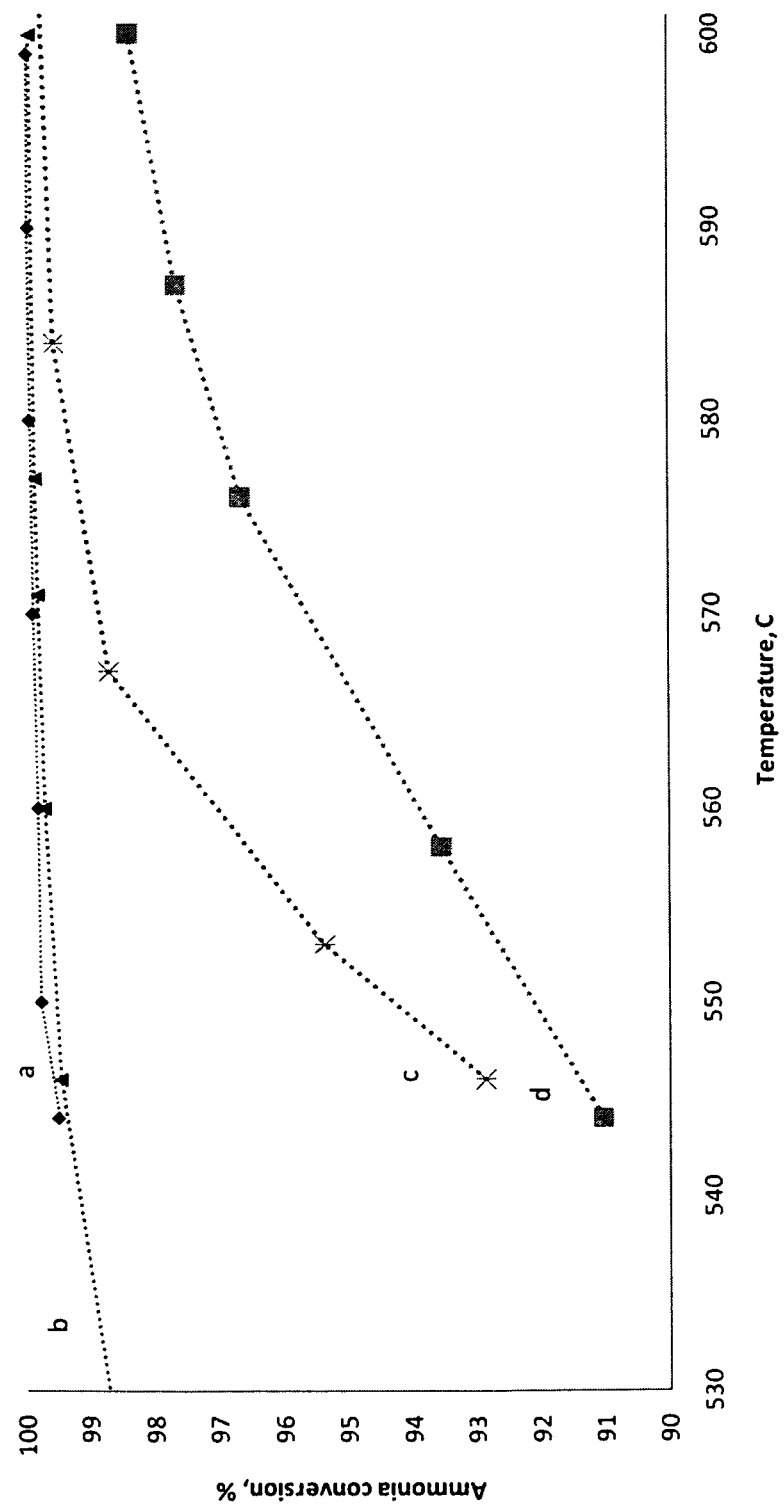
FIG. 1 is a graph comparing the activity of $Ru/Al_2O_3$ catalysts prepared according to Example 1 (curve b) Example 2 (curve a), and Example 3 (curve c) in comparison to the activity of commercially available 2% $Ru/Al_2O_3$ (Alfa Aesar) (curve d). The ammonia flow rate was 300 ml/min (NTP).

It was an aim if the invention to provide a method of preparing a Ru-containing catalyst for the decomposition of ammonia into nitrogen and hydrogen, which is less energy and time consuming than the method of the prior art, while still yielding a good catalytic activity.

It was surprisingly found that catalysts prepared according to the method of the invention which is considerably simpler than the method of the prior art, still show a good to very good catalytic activity, in particular when compared to a commercial 2% $Ru/Al_2O_3$ catalyst.

In the beginning of the preparation method, a ruthenium precursor compound, which can be converted into ruthenium, is dissolved in a liquid organic polyol.

Possible ruthenium precursor compounds are, e.g., selected from one or more of $RuCl_3 \cdot xH_2O$, usually $RuCl_3 \cdot 3H_2O$ (or $\sim 3H_2O$), $Ru_3(CO)_{12}$, $Ru(acac)_3$, $Ru(Oac)_3$ $Ru(NO_3)_3$, $Ru(ClO_4)_3$ and ruthenium amine complexes. $RuCl_3 \cdot 3H_2O$ and $Ru_3(CO)_{12}$ are preferred.

The liquid organic polyols may be selected from one or more of diols, triols and tetraols, such as ethylene glycol, glycerol, triethanolamine and trihydroxymethyl-aminomethane. They preferably have a boiling point of 300° C. or less. The viscosity thereof is typically in the range of from about $10^{-3}$ Pas to about 1 Pas, e.g. from about 0.05 to about 0.5 Pas, and particularly from about 0.1 to about 0.25 Pas. Ethylene glycol is particularly preferred.

The molar ratio of Ru atoms to polyol is preferably about 1:700 to about 1:4,000. In the case of ethylene glycol e.g. about 1:700 to about 1:1,100.

To the solution thus obtained, (a) nano-powder(s) of one or more metal oxide(s) may be added in a ratio of moles metal oxide(s) to moles ruthenium in the ruthenium precursor compounds employed of about 0.05:1 up to about 6:1, preferably of about 0.5:2 or about 0.8:1:5, most preferred of about 1:1. The nano-powders have a surface area of from about 5 to about 300 $m^2/g$, preferably of about 15 to about 250 $m^2/g$, such as about 20 to about 200 $m^2/g$ or about 20 to about 150 $m^2/g$.

Furthermore, the metal oxide(s) of the nano-powder(s) have a point of zero charge (PZC, i.e. the pH where the net charge surface in the presence of water is zero) of at least pH 5.5.

Without wishing to be bound by theory, it is believed that nano-powders might stabilize the ruthenium colloid which is produced in the reaction of the invention and prevent its agglomeration by adsorbing the colloid. Furthermore, it is believed that the presence of nano-powers on the surface of pre-shaped $Al_2O_3$ pellets which are added later in the method and are the necessary macroscopic carrier (see below) might prevent the activity-lowering aggregation or sintering of ruthenium clusters on the final catalyst when it is used for a prolonged time at a high temperature.

The reason for the prerequisite of a PZC corresponding to a pH value of at least about 5.5 is that ruthenium colloid in organic polyols have a PZC corresponding to a pH value of about 4 (a pH in organic polyols can be measured, since they are hygroscopic and always include some water, unless one works under extreme anhydrous conditions). When they are produced according to the method of the invention, they usually carry a negative charge which attracts protons, i.e. the pH value of the solution rises, usually to about pH 5. Metal oxides having a PZC of at least about 5.5 are positively charged at pH 5 and can therefore adsorb the ruthenium colloidal particles due to Coulomb attraction and, as it is believed, stabilize them and prevent agglomeration thereof.

Non-limiting examples of metal oxides having a PZC of at least 5.5 are $\gamma$-$Al_2O_3$ (PZC=about 9), BeO (PZC=about 7), $Bi_2O_3$, (PZC=about 9.4), $CeO_2$ (PZC=about 6.5) and $TiO_2$ in its Anatas modification (PZC=about 5.6-5.8). $\gamma$-$Al_2O_3$ and $CeO_2$ are presently particularly preferred.

Before the next addition step of the method of the invention, namely the addition of alumina pellets, the above solution or suspension is agitated well. In the case where nano-powder has been added, it is preferred to sonicate the suspension for e.g. up to 30 min, sometimes up to 60 min or even 120 min and thereafter stirred, e.g. for about 10 to about 60 min, before the alumina pellets are added.

Then pre-shaped alumina support pellets are usually added to the mixture in such an amount that the Ru content of the ruthenium precursor compounds is in the range of from about 0.5% to about 5%, e.g. be about 1%, about 1.5%, about 2% or about 2.5%, based on the weight of the alumina or the alumina plus the metal oxide power(s).

Pre-shaped pellets are used, because a dusting coated nano-powder is not suited for the use in an ammonia decomposition or cracking reactor. Pressing of a coated powder to form pellets thereof would be a waste of ruthenium which would be present to a large amount within such a pellet and not accessible for the ammonia to be decomposed.

The pre-shaped alumina pellets usually have a mean size of from about 0.2 to about 2 mm, more often from about 0.5 to about 1.5 mm, and particularly preferred of about 1 mm. The pore volume is usually in the range of from about 0.2 to about 0.7 ml/g, e.g. about 0.45 ml/g.

After addition of the alumina pellets, still under agitation, the mixture is heated at a temperature of about 50° C. to the boiling point of the organic polyol, usually at a temperature of from about 50° C. to about 300° C., e.g. from about 50° C. to about 197° C., or from bout 50° C. to about 175 or about 180° C., depending on the polyol used. The end of the reaction is indicated by a color change of the mixture to dark brown (in the case of $RuCl_3.3H_2O$ from blue to dark brown).

When the reaction is finished, the reaction vessel is immediately and rapidly cooled, e.g. in an ice bath, e.g. down to less than about 50° C., more often down to about 40° C. or about 30° C., most often to about ambient temperature, e.g. about 25° C.

Then the reaction mixture in the reaction vessel is combined with an aqueous solution of $NaNO_3$ and/or $KNO_3$. The concentration is usually chosen to be about 0.1 to about 1 M, and the amount of dissolved Na or K or Na+K ions in the aqueous solution combined with the reacted pellet mixture may e.g. vary from a combined atomic ratio of Na and K to Ru of from about 0.5 to about 6, more preferably about 0.8 to about 5, such as about 1 to about 3. The combined mixture is stirred well so as to allow possible deactivating anions on the surface of the coated alumina pellets to be washed off and the Na and/or K cations and non-deactivating nitrate anions to be adsorbed by the surface of the pellets.

The coated pellets are then isolated by some suitable means, such as filtration, centrifugation, stripping of the solvent in a vacuum etc.

Finally the coated pellets are dried, e.g. by simply spreading them and letting them dry under ambient atmosphere.

Drying at higher temperature or calcining of the coated pellets is usually superfluous, because they are completely dried and calcined, when they are used at high temperatures e.g. as an ammonia decomposing catalyst.

It is apparent that this method of preparing a supported Ru-containing catalyst is much simpler and less energy consuming than the method of the prior art.

The ruthenium-containing catalyst pellets obtainable by the above method are novel. Due to the conversion of the ruthenium precursor compound into ruthenium colloid in the solvent and its adhesion as such to the metal oxide powder or the alumina pellet, there will be no anions or neutral molecules arising from the precursor compound being hidden in pores under the ruthenium, as is the case with the catalyst of the prior art. Furthermore, a ruthenium-containing catalyst supported by alumina pellets which carries in its surface ruthenium coated nano-particles has not been disclosed in the prior art.

The ruthenium-containing catalyst of the invention is preferably, however without being limited thereto, used for the decomposition of ammonia into nitrogen and hydrogen, which in turn may be used in low-temperature fuel cells.

Figure 2:
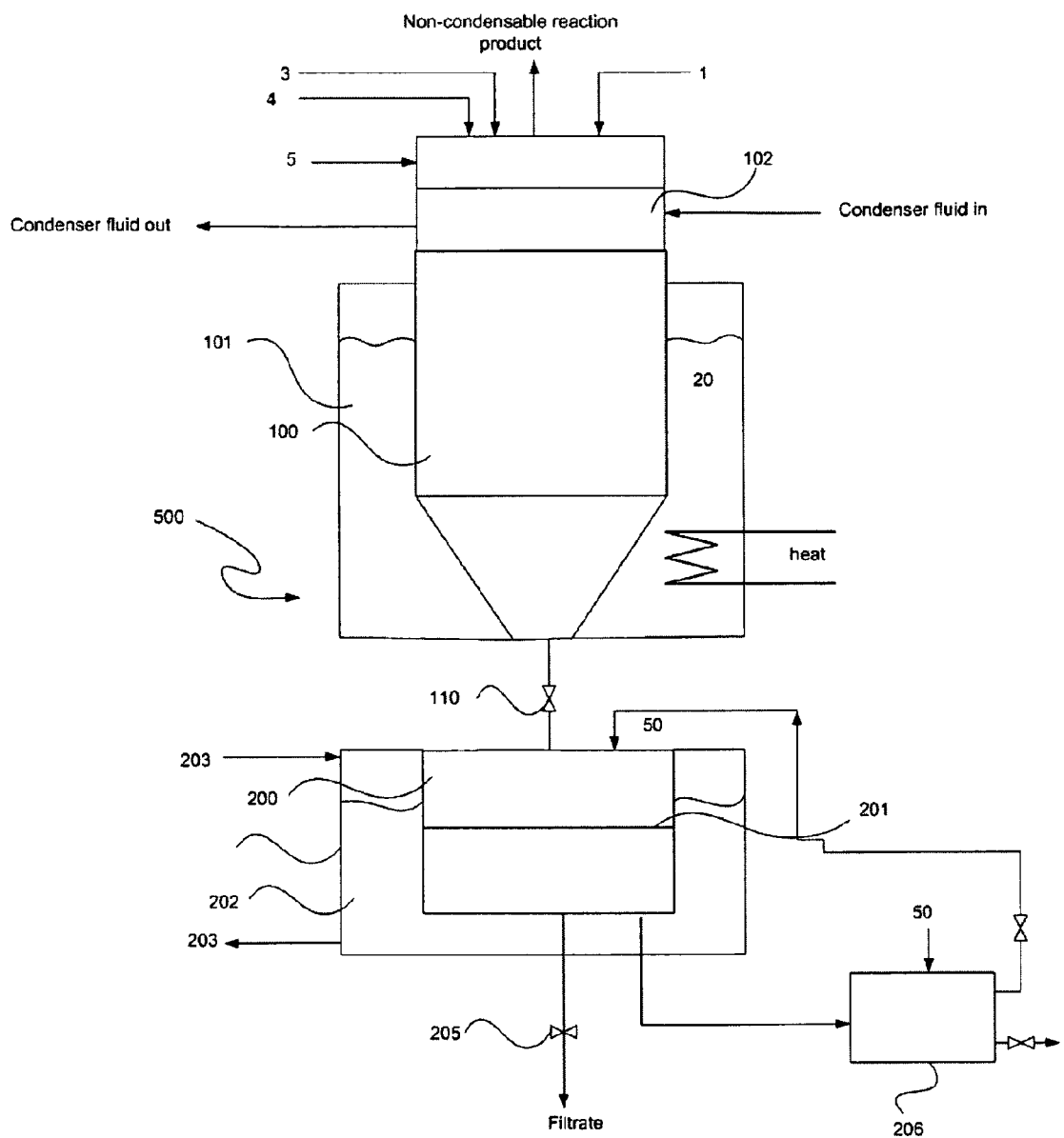
FIG. 2 is a schematic representation of a process equipment (500) for a batch process to produce the Ru-coated pre-shaped alumina particles in a commercial scale.

FIG. 2 schematically shows a process equipment of a batch process 500 for large scale commercial synthesis of the catalyst of the invention. A ruthenium precursor compound, such as hydrous $RuCl_3$, and an organic polyol, e.g. ethylene glycol 4, and optionally high surface area metal oxide nano-powder 5 are added to a batch mixer 100 with propellers and/or an ultrasonic wave generating device for producing a sonication effect in the mixer. After a stipulated mixing duration, pre-shaped alumina 1 is added to 100. The mixer 100 is surrounded by a thermostatic bath 101 where a thermostatic fluid 20 transfers heat to the mixer 100. The reactor is fitted with a condenser 102 for condensing vapor generated from the mixture 15 in 100. After a pre-specified reaction time, the mixture is taken to a washing and filtration chamber 200 by opening valve 110. The chamber is fitted with a shakable filter 201 through which the liquid and suspended part of the mixture is filtered out and taken out of the reactor by opening valve 205. A cooling jacket 202 surrounds 200. A refrigerant 203 with temperature below 25° C., but typically below 5° C. is circulated through 202. An aqueous solution of $NaNO_3$ or $KNO_3$ or both is placed in reservoir 206 from which the solution is sprayed on the solid phase on the filter 201 while it is being shaken. The liquid phase coming through filter 201 is circulated back to mix with the remaining liquid phase in reservoir 206 and circulated back to the filtration chamber 200. After the washing is completed, the Ru-containing coated alumina particles are collected.

EXAMPLES

Example 1

Preparation of 2% $Ru/Al_2O_3$ (without Nano-Powder)

A Ru catalyst was prepared as follows: 225 ml of ethylene glycol was added to a round bottom flask. 0.68 g of hydrated $RuCl_3$ ($RuCl_3.\sim 3H_2O$) was added to the ethylene glycol. The mixture was stirred magnetically at room temperature for 60 min. 15 g of alumina pellets (average diameter 1 mm) was added to the flask. A condenser was added to the flask and the assembly was put into a silicon oil bath with oil temperature at 180° C. After 18 minutes, the flask was removed from the oil and inserted into ice for e.g. 30 min. A $NaNO_3$ solution was prepared with 34.4 g of $NaNO_3$ in 1.3 l of DI water. The mixture in the round bottom flask was then added to the $NaNO_3$ solution and the mixture was magnetically stirred for e.g. 30 min. The resulting mixture was then filtered with a Hirsch funnel. The obtained coated $Al_2O_3$ pellets were then kept open to the ambient for 8 h.

Example 2

Preparation of 2% $Ru/Al_2O_3$ (with Alumina Nano-Powder)

A Ru catalyst was prepared as follows: 75 ml of ethylene glycol was added to a round bottom flask. 0.23 g of hydrated $RuCl_3$ ($RuCl_3.\sim 3H_2O$) and 0.53 g of γ-alumina nano-powder were added to the ethylene glycol. The mixture was sonicated for 10 min before stirring magnetically at room temperature for 60 min. Five (5) g of alumina pellets (average diameter 1 mm) was added to the flask. A condenser was added to the flask and the assembly was put into a silicon oil bath with oil temperature at 180° C. After 18 minutes, the flask was removed from the oil and inserted into ice for e.g. 30 min. A $NaNO_3$ solution was prepared with 12 g of $NaNO_3$ in 450 ml of DI water. The mixture in the round bottom flask was then added to the $NaNO_3$ solution and the mixture was magnetically stirred for 10 min, 20 min or 30 min. The resulting mixture was then filtered with a Hirsch funnel. The obtained coated $Al_2O_3$ pellets were then kept open to the ambient for 8 h.

Example 3

2% $Ru/Al_2O_3$ (with $CeO_2$ Nano-Powder)

A Ru catalyst was prepared as follows: 225 ml of ethylene glycol was added to a round bottom flask. 0.683 g of hydrated $RuCl_3$ ($RuCl_3.\sim 3H_2O$) and 2.69 g of $CeO_2$ nano-powder were added to the ethylene glycol. The mixture was sonicated for 10 min before stirring magnetically at room temperature for 60 min. Fifteen (15) g of alumina pellets (average diameter 1 mm) was added to the flask. A condenser was added to the flask and the assembly was put into a silicon oil bath with oil temperature at 180° C. After 18 minutes, the flask was removed from the oil and inserted into ice for e.g. 30 min. A $NaNO_3$ solution was prepared with 34 g of $NaNO_3$ in 41.3 l of DI water. The mixture in the round bottom flask was then added to the $NaNO_3$ solution and the mixture was magnetically stirred for 30 min. The resulting mixture was then filtered with a Hirsch funnel. The obtained coated $Al_2O_3$ pellets were then kept open to the ambient for 8 h.

Example 4

Test of the Activity of the Supported Ru-Containing Catalysts and a Commercial Sample in Decomposing (Cracking) $NH_3$ The catalysts were tested in a test reactor consisting of two concentric cylindrical chambers. The inner chamber (combustion chamber) used for combustion of either hydrogen or ammonia for providing the heat of the endothermic ammonia cracking reaction, consisted of a commercial 0.5% $Pt/Al_2O_3$ catalyst pellets (Alfa Aesar). The outer annular space (cracking chamber) contained the Ru-containing test catalysts obtained in Examples 1, 2 or 3 or 2% $Ru/Al_2O_3$ from a commercial source (Alfa Aesar). The chamber could hold about 25 gm of 1 mm alumina pellets. During testing of the catalysts, 5 gm of the test catalysts was uniformly mixed with 20 gm of blank alumina pellets. The cracking chamber was then filled with the mixture of the coated and uncoated pellets. The reactor was well insulated. At the start, hydrogen and air were introduced at one end of the combustion chamber. After 2 minutes, when the combustor is warm enough for ammonia combustion, the hydrogen was replaced by ammonia. The temperature of the reactor was observed at the cracking chamber at the end where combustion gases entered the reactor. When the temperature reached the desired level, ammonia was flowed through the cracking chamber with a flow rate of 300 ml/min(NTP) in a counter current fashion with the combustor inlet. The outlet temperature of the cracker exhaust was kept at the desired level by changing the ammonia combusted in the combustion chamber. The outlet of the cracking chamber was passed through an infrared ammonia analyzer (Servomex 2500) which measures the trace ammonia ppm in the stream. The trace ammonia concentration was converted into ammonia conversion for reporting purposes.

Curve a in FIG. 1 shows the ammonia conversion of the catalyst of Example 2, curve b the ammonia conversion of the catalyst of Example 1, curve c the ammonia conversion of the catalyst of Example 3, and curve d the commercial 2% $Ru/Al_2O_3$ catalyst (Alfa Aesar). All catalysts prepared according to the invention showed a better activity than the commercial catalyst. It is assumed that the catalyst of example 2, although showing a just slightly better catalytic activity than the catalyst of Example 1, when both are freshly prepared, might show a superior activity during prolonged use at high temperatures.

The invention claimed is:
1. A method of preparing a ruthenium-containing catalyst on a non-conductive metal oxide support, comprising:
   dissolving one or more ruthenium precursor compounds in a liquid organic polyol to form solution,
   combining the thus obtained solution with nano-powder(s) of one or more metal oxides in a ratio of moles metal oxide(s) to moles ruthenium atoms in the one or more ruthenium precursor compounds of about 0:1 to about 6:1, the metal oxide nano-powder(s) having a surface area of from about 5 to about 300 $m^2/g$ and a point of zero charge (PZC) of pH 5.5 or higher to form a mixture,
   agitating the thus obtained mixture,
   adding pre-shaped alumina support pellets to the agitated mixture,
   heating the agitated mixture at a temperature of about 50° C. to the boiling point of the organic polyol, until the one or more ruthenium precursor compounds have fully reacted, cooling the agitated mixture and combining it with an aqueous solution of NaNO$_3$ and/or KNO$_3$, agitating the resultant mixture, separating solvent and solids from the agitated resultant mixture, and drying the agitated resultant mixture to obtain nano-powder(s) metal oxide(s) supported on the alumina support pellets, each of the nano-powder(s) metal oxide(s) is further coated with ruthenium and an additional amount of Na and/or K.

2. The method of claim 1, wherein the ratio of moles metal oxide(s) to moles ruthenium atoms in the one or more ruthenium precursor compounds is about 0.5:2.

3. The method of claim 1, wherein the metal oxide nano-powder(s) have an average size of from about 4 nm to about 50 nm.

4. The method of claim 1, wherein the surface area of the metal oxide nano-powder(s) is about 15 to about 250 m$^2$/g.

5. The method of claim 1, wherein the metal oxide nano-powder(s) are selected from one or more of the group consisting of y-Al$_2$O3, BeO, Bi$_2$0$_3$ and CeO$_2$.

6. The method of claim 1, wherein the ruthenium precursor compound is selected from one or more of the group consisting of RuCl$_3$-3H20 and Ru$_3$(CO)$_{12}$.

7. The method of claim 1, wherein the pre-shaped alumina support pellets have a mean size of from about 0.2 to about 2 mm and a pore volume of about 0.2 to about 0.7 ml/g.

8. The method of claim 1, wherein the amount of the ruthenium atoms in the ruthenium precursor compound(s) is from about 0.25 to about 5% by weight, based on the weight of the alumina or the alumina plus the metal oxide(s) of the nano-powder(s).

9. The method of claim 1, wherein the molar ratio of Ru to polyol is about 1:700 to about 1:4,000.

10. The method of claim 9, wherein the polyol is ethylene glycol.

11. The method of claim 1, wherein the temperature at which the agitated mixture is heated, is from about 50° C. to about 175° C.

12. The method of claim 1, wherein the concentration of NaNO$_3$ and/or KNO3 respectively, in the aqueous solution is about 0.1 to about 1 mol/L.

13. The method of claim 1, wherein the atomic ratio of Na, K, or Na+K, respectively, in the aqueous solution to ruthenium on the solid pellets is about 0.5 to about 6.

14. A supported ruthenium-containing catalyst, comprising nano-powder(s) metal oxide(s) supported on alumina pellets, each of the nano-powder(s) metal oxide(s) is coated with ruthenium and an additional amount of Na and/or K.

15. The supported ruthenium-containing catalyst of claim 14 which is used in a method of decomposing NH$_3$ to N$_2$ and H$_2$.

16. The supported ruthenium-containing catalyst of claim 15, wherein the H$_2$ is used in a fuel cell.

* * * * *